March 5, 1963   F. W. LIVERMONT   3,079,785
TORQUE MEASURING APPARATUS
Filed June 30, 1960   3 Sheets-Sheet 1
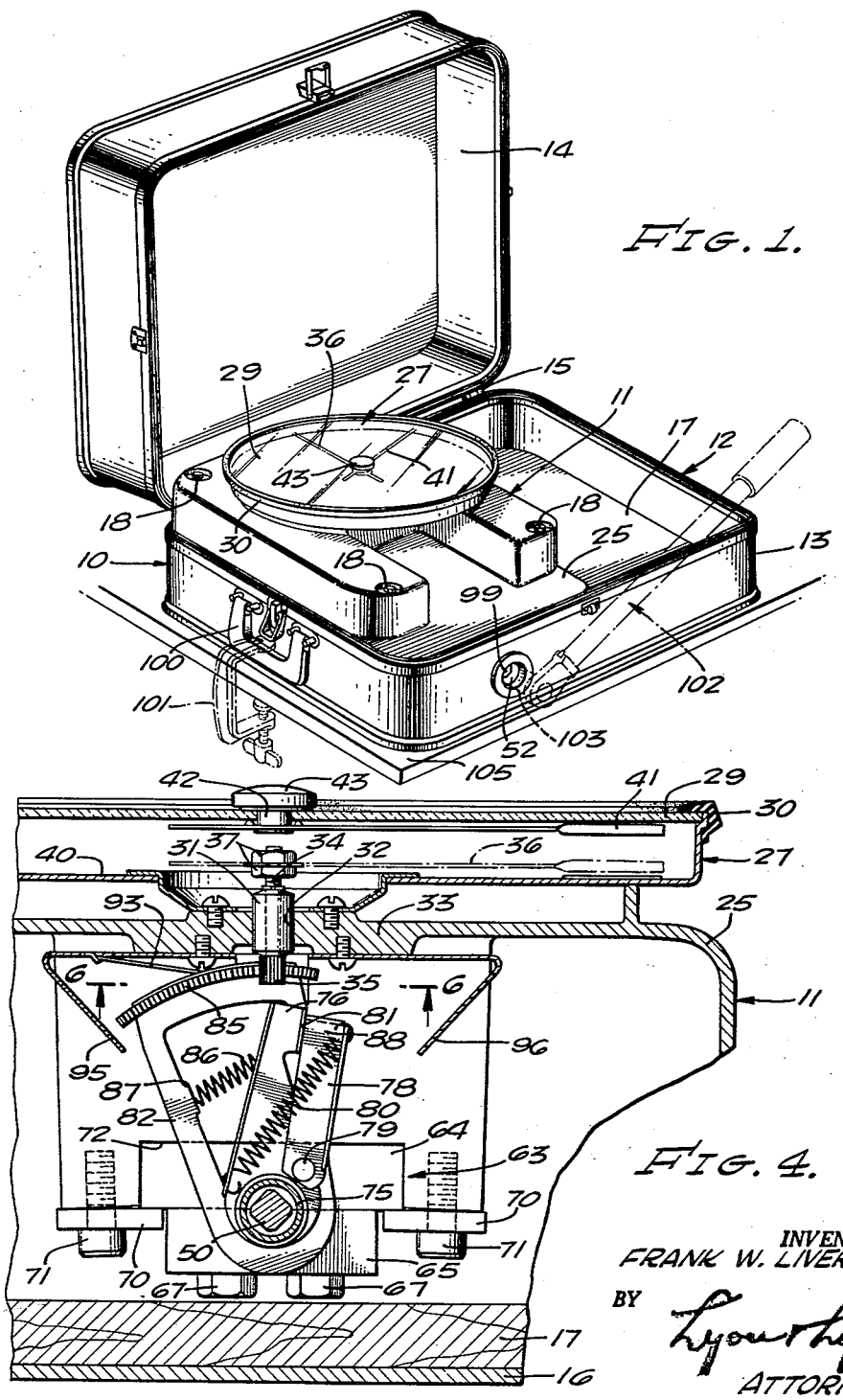
FIG. 1.
FIG. 4.
INVENTOR.
FRANK W. LIVERMONT
BY
ATTORNEYS March 5, 1963 F. W. LIVERMONT 3,079,785
TORQUE MEASURING APPARATUS
Filed June 30, 1960 3 Sheets-Sheet 2
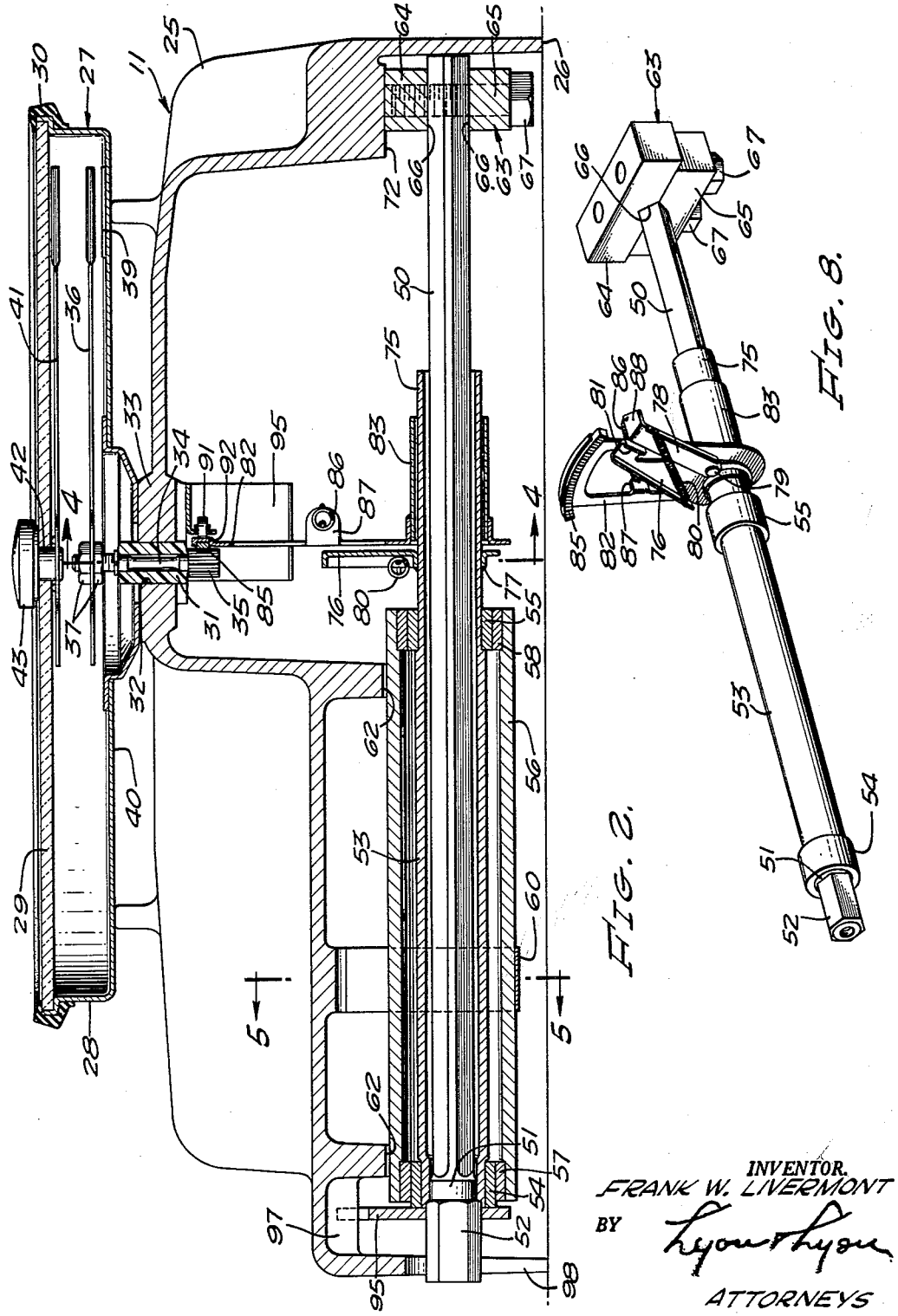
INVENTOR.
FRANK W. LIVERMONT
BY
ATTORNEYS March 5, 1963 F. W. LIVERMONT 3,079,785
TORQUE MEASURING APPARATUS
Filed June 30, 1960 3 Sheets-Sheet 3
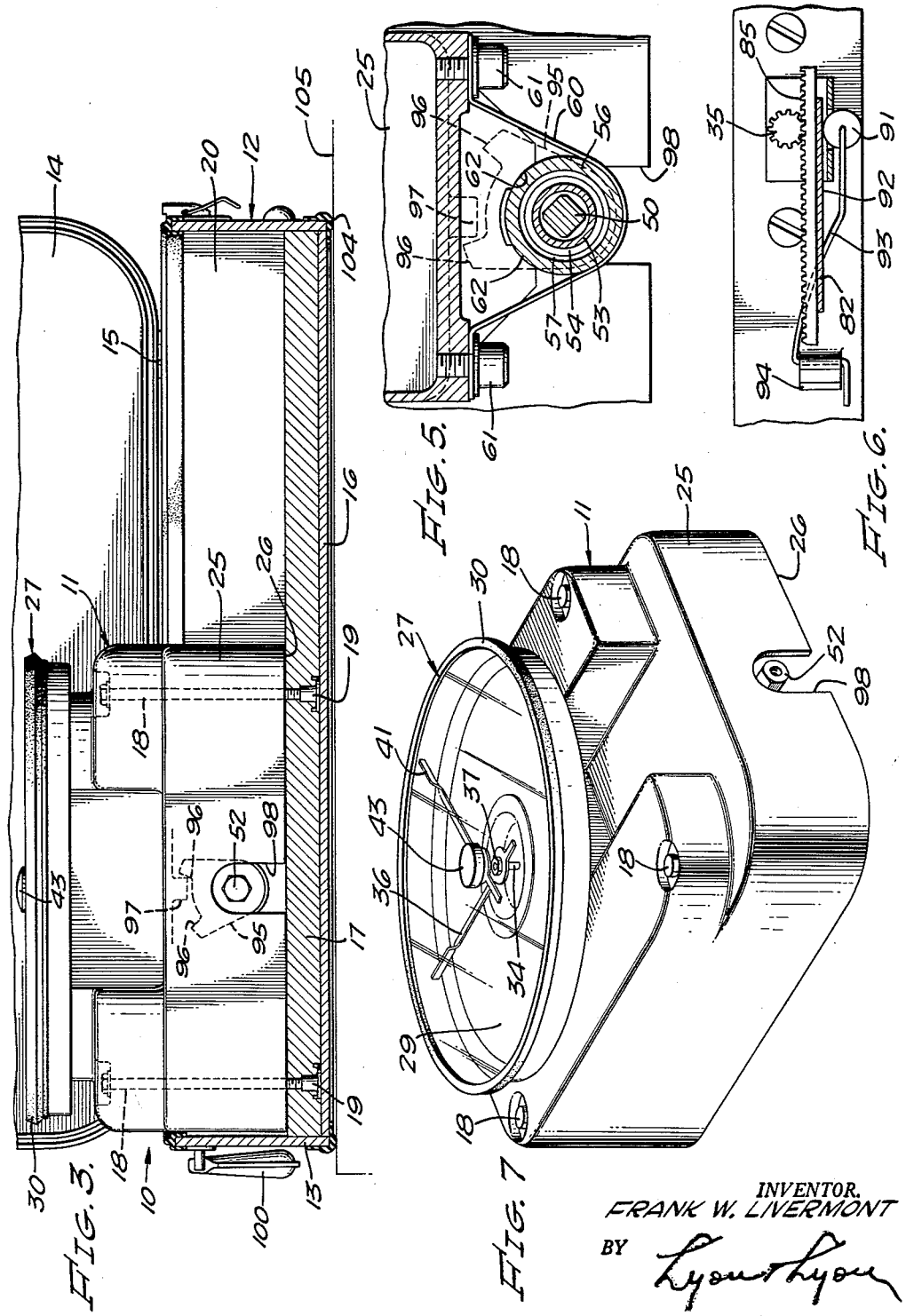
INVENTOR.
FRANK W. LIVERMONT
BY Lyon+Lyon
ATTORNEYS United States Patent Office 3,079,785
Patented Mar. 5, 1963

3,079,785
TORQUE MEASURING APPARATUS
Frank W. Livermont, Duarte, Calif.; Milford S. Zimmerman, executor of said Frank W. Livermont, deceased, assignor to Reed Roller Bit Company, Houston, Tex., a corporation of Texas
Filed June 30, 1960, Ser. No. 40,031
11 Claims. (Cl. 73—1)

This invention relates to torque measuring apparatus and is particularly directed to an improved form of device for measuring the torque setting of adjustable torque wrenches and the like. A measuring device of this general character is shown in my Patent No. 2,703,976, granted March 14, 1955. The device may conveniently be used for measuring and indicating the torque load setting of torque wrenches of the type shown in my prior Patents No. 2,887,921, granted May 26, 1959, and No. 2,899,854, granted August 19, 1959.

It is an important object of the present invention to provide an improved form of torque measuring apparatus particularly adapted to resist shock loads which occur when the torque load applied to the wrench and to the measuring device reaches a value at which the internal wrench mechanism "trips." The sudden change of load at the instant that the wrench "breaks" or "trips" results in an application of impact forces to the torque measuring apparatus. The device of the present invention is particularly adapted to receive such shock loads without damage, even when the torque setting of the wrench has a relatively high value.

Another object is to provide a torsion bar mechanism which can be installed and removed with respect to the base and indicator as a unitary pre-calibrated assembly.

Another important object of this invention is to provide torque measuring apparatus which includes a measuring and indicating instrument contained within a portable housing, the housing extending laterally from the instrument to prevent overturning of the instrument under applied torque loads, the lateral extension also providing space for storage of torque wrenches of various lengths as well as wrench heads of different sizes and types, adapters, adjusting tools, etc.

Other and more detailed objects will appear hereinafter.

FIGURE 1 is a perspective view showing a preferred embodiment of my invention.

FIGURE 2 is a longitudinal section view through the torque measuring instrument, the housing being omitted.

FIGURE 3 is a front elevation, partly in section, showing the device of FIGURE 1.

FIGURE 4 is a sectional elevation taken substantially on the lines 4—4 as shown in FIGURE 2.

FIGURE 5 is a transverse sectional detail taken substantially on the lines 5—5 as shown in FIGURE 2.

FIGURE 6 is a fragmentary view, partly in section, taken substantially on lines 6—6 as shown in FIGURE 4.

FIGURE 7 is a perspective view of the torque measuring instrument, the housing being omitted.

FIGURE 8 is a perspective view showing the torsion bar, gear segment and related parts which may be installed and removed as a unitary assembly.

Referring to the drawings, the torque measuring apparatus generally designated 10 includes a measuring and indicating instrument 11 mounted within a housing 12. The housing 12 includes a lower section 13 and a cover 14 pivotally connected by hinges 15. The lower wall 16 of the housing section 13 contains a stiffener floor 17 and the measuring and indicating instrument 11 rests on this floor 17. A plurality of bolts 18 which engage nuts 19 embedded in the floor 17 serve to anchor the instrument 11 to the floor 17. From a consideration of FIGURES 1 and 3 it will be noted that the floor 17 extends laterally from the instrument 11 for a considerable distance to define space 20 within the housing 12 at one side of the instrument 11.

The instrument 11 includes a base 25 having a lower surface 26 which rests on the stiffener floor 17. A horizontal dial gage, generally designated 27, is carried on the upper portion of the base 25 and includes a circular shell and a transparent cover or face 29, held in place thereon by means of a flexible retainer 30. A bushing 31 mounted within an opening 32 in the support flange 33 of the base 25 supports a shaft 34 for rotation about a vertical axis. A pinion gear 35 is fixed on the lower end of the shaft, and a movable indicator 36 is attached to the shaft by means of the clamping nuts 37. The outer swinging end of the indicator 36 travels in close proximity to a scale 39 inscribed in an arc on the upper surface of the shell flange 40. From this description, it will be understood that the pinion gear 35 and the movable indicator 36 turn as a single integral unit.

A pointer 41 is mounted for turning movement about the vertical axis of the shaft 34 but is carried on a stub shaft 42 fixed to the manually operable knob 43. The stub shaft 42 projects through a central opening in the transparent face 29 so that the knob 43 is accessible for manual manipulation to swing the pointer 41 to any desired angular position.

A torsion bar 50 is generally non-circular in cross section and is provided with an enlarged circular portion 51 and a further enlarged non-circular portion 52. The non-circular portion 52 consists of a torque-receiving element and is preferably formed as an integral enlargement of the torsion bar 50. It may be hexagonal in shape for reception within conventional type wrench sockets. A tube 53 encircles a portion of the torsion bar 50 and is fixed at one end to the circular enlargement 51. A metal ring 54 encircles the tube 53 and enlargement 51 and a similar metal ring 55 encircles the tube 53 at an axially spaced location. A sleeve 56 is mounted coaxially of the tube 53 and is provided with axially spaced bearing rings 57 and 58 which support the rings 54 and 55 and the tube 53 for rotary movement with respect to the shell 56. A clamping strap 60 (see FIG. 5) passes under the shell 56 and is secured to the underside of the base 25 by means of threaded fasteners 61. The sleeve 56 is thus clamped against the prepared surfaces 62 on the lower side of the base 25.

A two-part block member, generally designated 63, includes an upper clamp bar 64 and a lower clamp bar 65 having aligned V notches 66 for engagement with the flat sides of the non-circular torsion bar 50. Threaded fasteners 67 serve to hold the clamp bars 64 and 65 together about the torsion bar 50. The two-part block 63 member is attached to the base casting 25 by means of lugs 70 and threaded fasteners 71. The lugs 70 engage under the projecting ends of the block 64 and secure it against the downward facing shoulder 72 provided on the base casting 25.

A portion 75 of the tube 53 projects out of the sleeve 56 and an arm 76 is fixed on this projecting portion by any convenient means such as, for example, by welding 77. A lever 78 is pivotally mounted on the arm 76 by means of the pivot pin 79. A coil spring 80 acting in tension acts resiliently to hold the lever 78 against the abutment 81 provided on the arm 76. A gear segment 82 is carried on a hub 83 loosely mounted to turn on the tube extension 75. This gear segment 82 is provided with gear teeth 85 which mesh with the teeth of the pinion gear 35 fixed to the lower end of the vertical shaft 34. This eliminates looseness and provides zero backlash. A coil spring 86 acting in tension connects the lever 78 to a tab 87 fixed on the gear segment 82. From this description it will be understood that turning movement of the arm 76 about the axis of the torsion bar 50 causes the tab 88 at the upper end of the lever 78 to move the gear segment 82 and thereby turn the pinion gear 35 and the moving indicator 36.

It has been found that the materials from which the torsion bar 50 and the clamp bars 64 and 65 are constructed are important in order that the machine have a long service life of trouble-free operation. A good material for the torsion bar 50 is the type known as M2 high-speed steel sold by Allegheny Ludlum Steel Corporation. Nonferrous clamp bars 64 and 65 are preferred and in practice these are constructed of aluminum alloy. Calibration of the torsion bar 50 with respect to the dial 39 is accomplished by moving the clamp block 63 axially to the desired position and then tightening the threaded fasteners 67.

The assembly shown in FIGURE 8 (including the sleeve 56 and bearings 57, 58, not shown) may be installed and removed as a unitary precalibrated assembly. This is accomplished by turning the threaded fastenings 61 and 71 for releasing or tightening the clamping strap 60 and the block 63.

A back-up roller 91 engages the arcuate surface 92 at the extending end of the gear segment 82 at a location directly behind the gear teeth 85. This roller is mounted on a wire spring 93 extending from a stationary bracket 94 and it applies a lateral force tending to maintain the gear teeth in meshing engagement. Spring stops 95 and 96 are provided to limit the travel of the gear segment 82 in both directions. Maximum turning movement of the torque-receiving element 52 on the torsion bar 50 is limited by engagement of the shoulders 96 on the plate 95 with the lug 97 provided on the base casting 25. The plate 95 is fixed to the torque-receiving element 52. The function of the plate 95 and lug 97 is to protect the mechanism against application of excessive torque loads.

The torque receiving element 52 projects into the slot 98 provided on the base casting 25 and is aligned with the aperture 99 provided on the lower section 13 of the housing 12. A carrying handle 100 is also mounted on the lower section 13.

In operation, the device 10 is rested on a horizontal surface and the cover 14 is raised. If the torque loads to be applied are of high magnitude a C clamp 101 is engaged with the handle 100 to anchor the device in place on the horizontal surface. A torque wrench assembly 102, as shown in phantom lines in FIGURE 1, is connected to a socket part 103 which extends through the aperture 99 and slot 98 and engages the non-circular torque-receiving portion 52 of the torsion bar 50. The knob 43 is then manually turned to bring the pointer 41 in alignment with the desired torque setting as shown by the scale 39. A downward force is then applied to the torque wrench handle, thereby turning the free end of the torsion bar 50 and turning the tube 53 and tube-extension 75 therewith. The arm 76 turns with the tube and tube extension and the lever 78 and gear segment 82 move as a unit with the arm 76. The gear teeth 85 cause the pinion 35 to turn and thereby move the indicator 36 along the arcuate scale 39.

If the internal mechanism of the torque-wrench assembly 102 is properly set for the torque value desired, such mechanism will "break" or "trip" when the indicator 36 reaches a position directly under the pointer 41. The shock loads which accompany the tripping action of the torque wrench, particularly for torque loads at the high end of the range, do not act to damage the gear teeth 85 or teeth of the pinion 35 because the gear segment 82 is not rigidly fixed to the tube 53 or its extension 75. Two separate "breaks" or "trips" occur for each cycle of testing of a torque wrench of the usual type having internal mechanism which includes a toggle device and an adjustable spring. The first "break" occurs when the toggle mechanism trips under increasing applied load, against the action of the spring, and causing a sudden drop in load. The second occurs as the applied load decreases, as the spring resets the toggle mechanism, and causing a sudden increase in load. These shock loads are in opposite directions. When the sudden shock loads occur, the spring 80 or spring 86 permits angular lost motion to occur between the arm 76 and the gear segment 82, and thus the hammer-like blow is not transmitted to the gear segment 82.

If, under increasing applied torque load, the internal mechanism of the torque wrench 102 trips at a value which is too high or too low with respect to the desired torque load as shown by the pointer 41, such mechanism is adjusted by conventional means (not shown) until the mechanism trips at the desired torque value. The wrench handle, wrench head extensions and socket parts 103 are then removed as a unit from the device 10 and employed on the work to be done without change or alteration. Adjustments of the torque setting of the wrench 102 are made only at the device 10 where the dial gage 27 provides an accurate indication of the torque applied when the wrench mechanism trips.

Except for exceptionally high torque loads at the upper end of the range of the instrument 11, the C clamp 101 is not necessary because overturning of the base 25 is prevented by the stiffener floor 17 which extends laterally from the base 25. From a consideration of FIGURE 3, it will be apparent that so long as the application of force to the wrench handle is located to the left of the lower edge 104 of the housing 12, the housing 12 will remain at rest on the horizontal surface 105. Moreover, the space 20 within the housing 12 at one side of the instrument 11 provides a convenient space for storing wrench handles, wrench heads, adapters, extensions, sockets, etc.

An important advantage of the torque measuring instrument as described above is that the entire device is readily portable and may be carried about by means of the handle 100 in the manner of a suitcase. It may therefore be transported without difficulty to the location of the work and proper size of wrenches, adapters, sockets, etc., selected from the group provided within the space 17.

Having fully described my invention, it is to be understood that I am not to be limited to the details herein set forth but that my invention is of the full scope of the appended claims.

I claim:

1. In a device for indicating the magnitude of a torque load applied by a tool, the combination of: a base having a dial gage thereon provided with a movable indicator, a pinion gear connected to turn the indicator, a torsion bar, means whereby one end of said torsion bar is fixed relative to the base, the torsion bar having a non-circular torque-receiving element at the other end, a gear segment meshing with said pinion gear and mounted for pivotal motion about the axis of said torsion bar, a member fixed to said torsion bar at a location adjacent said torque-receiving element, an arm fixed on said member, and means including resilient means connecting said arm and said gear segment.

2. In a device for indicating the magnitude of a torque load applied by a tool, the combination of: a base having a dial gage thereon provided with a movable indicator, a pinion gear connected to turn the indicator, a torsion bar, means fixing one end of the torsion bar relative to the base, the torsion bar having a non-circular torque-receiving element at its other end, a gear segment meshing with said pinion gear and mounted for pivotal motion about the axis of said torsion bar, a tube mounted coaxially of said torsion bar and fixed thereto at a location adjacent said torque-receiving element, an arm fixed on the tube, and means including resilient means connecting said arm and said gear segment.

3. In a device for indicating the magnitude of a torque load applied by a tool, the combination of: a base having a dial gage thereon provided with a movable indicator, a pinion gear connected to turn the indicator, a torsion bar, means whereby one end of said torsion bar is fixed relative to the base, the torsion bar having a non-circular torque-receiving element at the other end, bearing means on the base supporting the torsion bar at a location adjacent said torque-receiving element, a gear segment meshing with said pinion gear and mounted for pivotal motion about the axis of said torsion bar, a tube mounted coaxially of said torsion bar and fixed thereto at a location adjacent said torque-receiving element, a sleeve fixed to said base and encircling a portion of said tube, bearing means supporting said tube within said sleeve, an arm fixed on the tube, and means including resilient means connecting said arm and said gear segment.

4. In a device for indicating the magnitude of a torque load applied by a tool, the combination of: a base having a dial gage thereon provided with a movable indicator, a pinion gear connected to turn the indicator, a torsion bar having one end fixed relative to the base and having a non-circular torque-receiving element at the other end, a gear segment meshing with said pinion gear and mounted for pivotal motion about the axis of said torsion bar, a member fixed relative to the first said end of said torsion bar, an arm fixed on said member, a lever pivoted on said arm and contacting said gear segment, and spring means acting to hold said arm in contact with said lever.

5. In a device for indicating the magnitude of a torque load applied by a tool, the combination of: a base having a dial gage thereon provided with a movable indicator, a pinion gear connected to turn the indicator, a torsion bar having one end fixed relative to the base and having a non-circular torque-receiving element at the other end, a gear segment having teeth meshing with said pinion gear and mounted for pivotal motion about the axis of said torsion bar, a roller mounted on the base engaging a portion of the gear segment to hold it in mesh with said pinion, a tube mounted coaxially of said torsion bar and fixed thereto at a location adjacent said torque-receiving element, an arm fixed on the tube, a lever pivoted on said arm, and means including spring means connecting said lever to said arm and to said gear segment.

6. In a device for indicating the magnitude of a torque load applied by a tool, the combination of: a base having a dial gage thereon provided with a movable indicator, a pinion gear connected to turn the indicator, a torsion bar having one end fixed relative to the base and having a non-circular torque-receiving element at the other end, a tube mounted coaxially of said torsion bar and fixed thereto at a location adjacent said torque-receiving element, a gear segment meshing with said pinion gear and having a hub mounted to turn on said tube, an arm fixed on the tube, a lever pivoted on said arm and contacting the gear segment to turn it in one direction, and spring means connecting said lever to said arm and to said gear segment.

7. In a device for indicating the magnitude of a torque load applied by a tool, the combination of: a base having a dial gage thereon provided with a movable indicator, a torsion bar having a block element secured on one end and a non-circular torque-receiving element at the other end, a tube mounted coaxially of said torsion bar and fixed thereto at a location adjacent said torque-receiving element, means actuated by the tube for turning said indicator, a sleeve encircling said tube, bearings within the sleeve supporting the tube for turning movement, a first releasable clamp on the base for securing the block element to the base, and a second releasable clamp on the base for securing said sleeve to the base, whereby upon release of said clamps the torsion bar, tube, drive means and sleeve may be removed from the base as a unitary assembly.

8. In a device for indicating the magnitude of a torque load applied by a tool, the combination of: a base having a dial gage thereon provided with a movable indicator, a torsion bar having a block element secured on one end and a non-circular torque-receiving element at the other end, a member fixed to said torsion bar at a location adjacent said torque-receiving element, means actuated by said member for turning said indicator, a sleeve encircling said tube, bearings within the sleeve supporting said member for turning movement, a first releasable clamp on the base for securing the block element to the base, and a second releasable clamp on the base for securing said sleeve to the base, whereby upon release of said clamps the torsion bar, member, drive means and sleeve may be removed from the base as a unitary assembly.

9. In a device for indicating the magnitude of a torque load applied by a tool, the combination of: a base having a dial gage thereon provided with a movable indicator, a pinion gear connected to turn the indicator, a torsion bar having a block element fixed on one end and a non-circular torque-receiving element at the other end, a tube mounted coaxially of said torsion bar and fixed thereto at a location adjacent said torque-receiving element, drive means including a gear segment mounted on the tube for turning said pinion gear, a sleeve encircling said tube, bearings within the sleeve supporting the tube for turning movement, a first releasable clamp on the base for securing the block element to the base, and a second releasable clamp on the base for securing said sleeve to the base, whereby upon release of said clamp the torsion bar, tube, gear segment and sleeve may be removed from the base as a unitary assembly.

10. In a device for indicating the magnitude of a torque load applied by a tool, the combination of: a base having a dial gage thereon provided with a movable indicator, a pinion gear connected to turn the indicator, a non-circular torsion bar having a block element secured on one end and an enlarged torque-receiving element at the other end, a tube mounted coaxially of said torsion bar and fixed thereto at a location adjacent said torque-receiving element, drive means including a gear segment mounted on the tube for turning said pinion gear, a sleeve encircling said tube, bearings within the sleeve supporting the tube for turning movement, a first releasable clamp on the base for securing the block element to the base, and a second releasable clamp on the base for securing said sleeve to the base, whereby upon release of said clamp the torsion bar, tube, drive means and sleeve may be removed from the base as a unitary assembly.

11. For use with a torque indicating gage having; a base and a dial gage thereon provided with a movable indicator driven by a pinion gear, the subcombination comprising: a torsion bar, a block element fixed on one end of said torsion bar and a non-circular torque-receiving element at the other end, a tube mounted coaxially of said torsion bar and fixed thereto at a location adjacent said torque-receiving element, drive means including a gear segment mounted on the tube for turning said pinion gear, a sleeve encircling said tube, said block element and said sleeve being adapted for clamping engagement with said base, and bearings within the sleeve supporting the tube for turning movement.

References Cited in the file of this patent
UNITED STATES PATENTS

| | | |
|---|---|---|
| 1,671,220 | Bartholody | May 29, 1928 |
| 2,120,386 | Baash et al. | June 14, 1938 |
| 2,342,919 | Chapman | Feb. 29, 1944 |
| 2,706,903 | Livermont | Apr. 26, 1955 |
| 2,885,884 | Nelson | May 12, 1959 |
| 2,945,374 | Simmons | July 19, 1960 |